United States Patent
Reindle

(10) Patent No.: US 6,671,369 B2
(45) Date of Patent: Dec. 30, 2003

(54) METHOD AND APPARATUS FOR RETURNING A FALSE SPECIAL INFORMATION TONE FOR AN INCOMING TELEPHONE CALL

(75) Inventor: Mark E. Reindle, Parma, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

(21) Appl. No.: 09/989,644

(22) Filed: Nov. 20, 2001

(65) Prior Publication Data
US 2003/0095653 A1 May 22, 2003

(51) Int. Cl.⁷ .............................................. H04M 1/00
(52) U.S. Cl. ........................................ 379/361; 379/353
(58) Field of Search .................................. 379/361, 353

(56) References Cited

U.S. PATENT DOCUMENTS

| | | |
|---|---|---|
| 5,467,388 A | 11/1995 | Redd, Jr. et al. |
| 5,553,125 A | 9/1996 | Martensson |
| 5,659,602 A | 8/1997 | Gay |
| 5,748,709 A | 5/1998 | Sheerin |
| 5,883,942 A | 3/1999 | Lim et al. |
| 5,920,623 A | 7/1999 | Bensman et al. |
| 6,195,421 B1 | 2/2001 | Chen |
| 2002/0009185 A1 | 1/2002 | Tung |
| 2002/0041666 A1 * | 4/2002 | Mastro et al. .............. 379/199 |

OTHER PUBLICATIONS

"The Complete Guide to Eradicating Nuisance Sales Calls," CallmeNot, LLC, 2001.
callmenot.safeserver.com/about_sceener.phtml, 2001.

* cited by examiner

Primary Examiner—Minsun Oh Harvey
Assistant Examiner—Jefferey Harold
(74) Attorney, Agent, or Firm—Fay, Sharpe, Fagan, Minnich & McKee, LLP

(57) ABSTRACT

A method and apparatus (10) for returning a false signal substantially similar to at least a first portion of a special information tone (SIT) after a device receiving an incoming telephone call puts the telephone line (11) in an off-hook condition is provided. The apparatus includes: a power distribution member (30); a mode selection member (28), a programmable oscillator (18); an off-hook detector (14); and, a controller (12). The method includes the steps: selecting a mode of operation from a group of multiple operating modes; detecting an off-hook condition in the telephone line; generating a false signal according to the selected SIT and the selected mode of operation; and, sending the false signal over the telephone line in response to the incoming telephone call once the off-hook condition is detected.

21 Claims, 1 Drawing Sheet

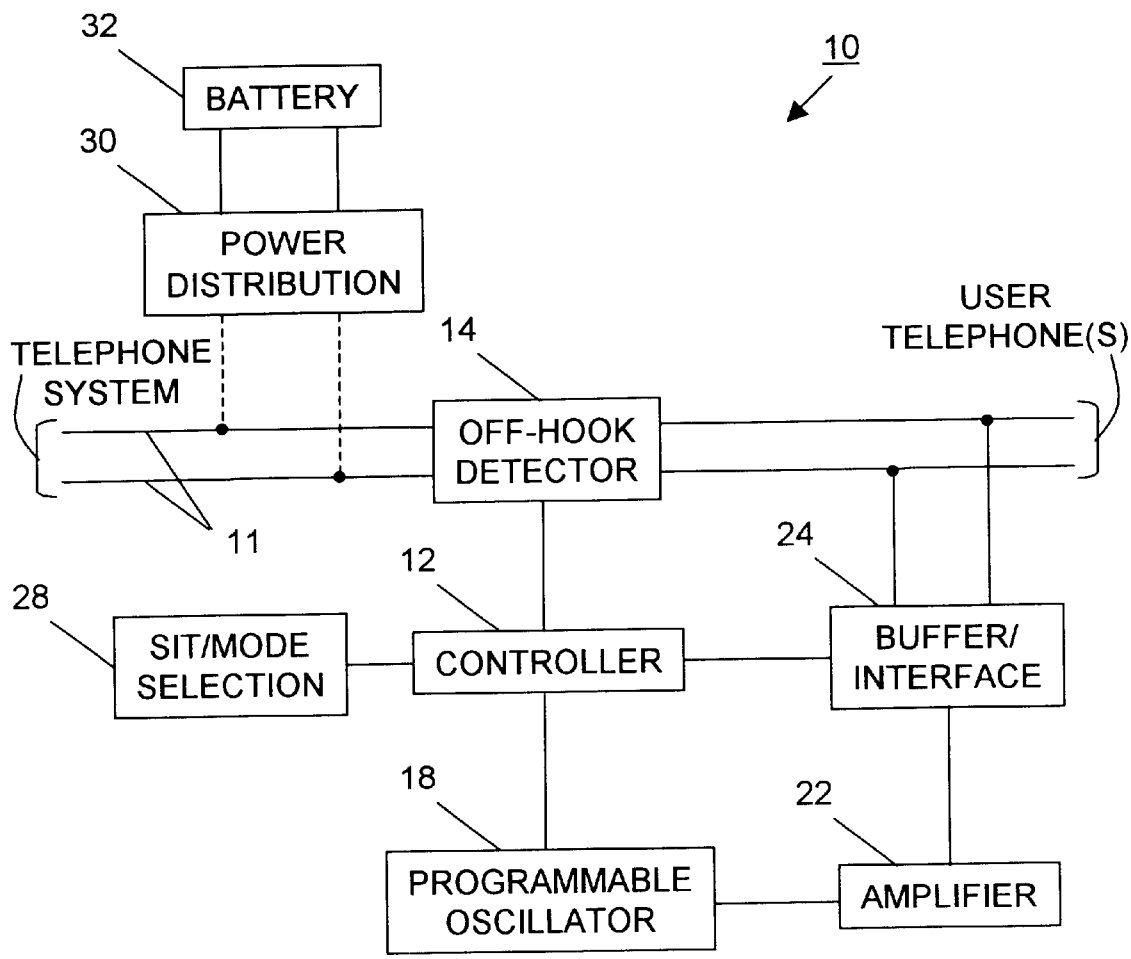

METHOD AND APPARATUS FOR RETURNING A FALSE SPECIAL INFORMATION TONE FOR AN INCOMING TELEPHONE CALL

BACKGROUND OF THE INVENTION

1. Technical Field

This invention relates to the field of telephony and more particularly to a method and apparatus for returning a false special information tone (SIT) or portion thereof in response to an incoming telephone call. Specifically, the present invention relates to a method and apparatus for returning a false signal substantially similar to at least a first portion of a SIT after a device receiving the call puts the telephone line in an off-hook condition.

2. Background Information

Telemarketing has increased exponentially in recent times. Many people targeted by telemarketers do not desire to receive or answer the telemarketing calls. Thus, it is desirable in the art to provide a method and apparatus that may be used to block telemarketing calls and potentially reduce or eliminate future telemarketing calls.

One method for preventing some telemarketing calls is to have your telephone number removed from the dialing list of the telemarketer. This method, however, involves effort and is only partially effective because new calling lists are constantly generated which reestablish your number as a target.

Another method to block calls is to simply take your phone off the hook when telemarketing calls are undesired. Such a method is undesirable because the method does not permit desired calls to be connected and received. The method also causes the phone to emit a loud off-hook warning signal that may annoy the owner of the phone. Instead of leaving the phone off the hook, a person may use an answering machine or a caller identification device to screen calls. Both of these methods are undesirable because some people do not leave messages, and some numbers cannot be identified by the caller identification device.

In view of these deficiencies, other devices have been developed in the art to permit selective blocking of calls. For instance, U.S. Pat. No. 5,467,388 discloses a method and apparatus for selectively blocking incoming calls. The patent discloses an apparatus that may be programmed to selectively block calls either by time block or by number. The user must, however, spend time to program the system and remember to activate it when the blocking function is desired. Such steps are generally undesired due to the effort required by the user. Thus, a method and apparatus that automatically blocks calls placed from a predictive dialing telemarketing system is highly desirable. Further, the method and apparatus should not require any preprogramming or activation steps. Also, the system must allow desired calls to be connected while still blocking undesired calls.

To more fully understand the concepts of the present invention, it should be understood that most large-scale automated telemarketing systems use predictive or auto-dialers to place the phone calls. These dialers obtain a number to be called from a computer database and place the telemarketing calls for the operator. If a call is connected and a live person responds, the system immediately connects the call to a salesperson, operator, or solicitor who makes a presentation. If the line is unanswered, busy, or answered by an answering machine, the system flags the number and returns to the number at a later time and recalls it. In this manner, the telemarketing system continues to call all programmed numbers until a live person answers. The system also does not waste time having the operator place unanswered calls.

In other situations where the called number has been disconnected or is otherwise no longer in service, the automated telemarketing system removes the number from its computer database. The computer differentiates the status of the number by recognizing special information tones (SITs) used in the U.S. telephone network. The network uses the SITs to provide information to computers in the network. SITs are three precise, sequential tones used to identify recorded announcements provided for ineffective call attempts in the telephone network. There are seven major SIT types known as SIT1 through SIT7. A telemarketing system is designed to maximize outbound calls and maximize completed calls. Thus, most quality telemarketing systems are designed to recognize SITs. One of the most common SITs is SIT2 which is the intercept SIT. The intercept SIT is used to describe an uncompleted call attempt due to a nonworking number. The intercept SIT begins with a tone of 913.8 Hz that is played for 274 milliseconds. This tone is followed by a second tone of 1370.6 Hz played for 274 milliseconds and completed with a third tone at 1776.7 Hz played for 380 milliseconds. When this SIT is received by a telemarketing system using a predictive dialer, the system notes that the number called is non-working and removes it from its database so that it will not be called again.

U.S. Pat. No. 5,920,623, commonly assigned to Royal Appliance Mfg. Co., discloses a method and apparatus for defeating a predictive dialing telemarketing system. The apparatus includes a signal generator in the nature of an oscillator that is capable of creating a 914 Hz sine wave that substantially imitates the first tone of an intercept SIT (i.e., SIT2) used by the telephone network to indicate a nonworking number. The oscillator is amplified with an amplifier. The imitation signal is selectively sent in response to the incoming call when a controller closes a relay to connect the imitation signal to the telephone line. The controller is prompted to close the relay by an off-hook detector that indicates to the controller when a voice signal is established. In addition to this embodiment, the '623 patent contemplated the capability to create any of the known SIT sequences in full or in part. The device produced in conjunction with the '623 patent was powered using a conventional a.c. utility power adapter.

It is desirable to provide an improved method and apparatus for returning a false SIT when an incoming telephone call is answered whereby the user can select the specific SIT and number of tones. Furthermore, it is desirable for such a method and apparatus to operate without a.c. utility power.

BRIEF SUMMARY OF INVENTION

In one aspect of the present invention, an apparatus in communication with a telephone line is provided. One embodiment of the apparatus comprises: a power distribution member; a programmable oscillator; an off-hook detector; and, a controller.

Another embodiment of the apparatus comprises: a programmable oscillator; a mode selection member; an off-hook detector; and, a controller.

In another aspect of the present invention, a method for sending a false signal on a telephone line substantially similar to at least a first part of a SIT in response to an answered incoming telephone call is provided. The method comprises the following steps: selecting a mode of operation from a group of multiple operating modes; detecting an off-hook condition in the telephone line; generating a false signal according to the selected SIT and the selected mode of operation; and, sending the false signal over the telephone line in response to the incoming telephone call once the off-hook condition is detected.

These and other aspects of the invention will become apparent to those skilled in the art in light of the following disclosure and accompanying drawing. To acquaint persons skilled in the arts most closely related to the present invention, preferred embodiments of a method and apparatus for returning a false SIT or portion thereof in response to an answered incoming telephone call are described herein by, and with reference to, the annexed drawing that forms a part of the specification. The exemplary method and embodiments of the apparatus are described in detail without attempting to show all of the various forms and modifications in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

BRIEF DESCRIPTION OF THE DRAWING

For a complete understanding of the objects, techniques, and structure of the present invention, reference should be made to the following detailed description and the accompanying drawing which is a schematic diagram of the apparatus used to accomplish the concepts of the present invention.

DETAILED DESCRIPTION OF THE INVENTION

In general, the concept of the present invention is to imitate a telephone network special information tone (SIT) by sending a false signal over the telephone line each time a voice signal is created when a phone is taken off hook. SITs are sine wave signals that are sent at a predetermined frequency and duration. The frequencies and durations of the SITs are generally known in the art and may be obtained from numerous sources including, for example, the Audichron Operator's Manual 0M10-0022. The apparatus of the present invention has the capability of playing any one of the seven major SIT sequences (i.e., SIT1, SIT2, SIT3, SIT4, SIT5, SIT6, and SIT7) in full or a portion thereof in depending on user selection. SITs are three precise, sequential tones used to identify certain conditions related to ineffective call attempts in the telephone network. The apparatus also has the capability to generate a false signal substantially similar to the first tone, first and second tone, or all three tones of any one of the seven major SITs depending on user selection. This is particularly useful because many telemarketing systems will, in the interest of conserving time, determine that a full SIT sequence has been received after the first tone in that sequence has been detected. Thus, it may only be necessary to send the first tone in the sequence. As such, a predictive dialing telemarketing system is said to be "defeated" because the false signal will cause the telemarketing system to immediately disconnect the call and remove the number from its database.

There are four major approaches for using the method and apparatus of the present invention. First, the apparatus may be built into an answering device so that the false SIT tones are sent immediately before any recorded announcement is sent. Second, the device may be contained in a plug-in device and may be connected to a telephone line such that the false SITs are sent whenever an incoming call has been answered. In this situation, the originator and recipient of the call will likely hear the false SITs when the call is answered. Third, the apparatus may be built into a multi-line, business-type phone bank such that the false SIT is sent over each incoming line. Lastly, the apparatus may be built directly into a telephone such that the false SITs are sent whenever a call is answered. The method and apparatus of the present invention functions equally well in cordless and wireless telephones (e.g., 900 MHZ cordless phones, 2.4 Ghz cordless phones, cellular phones, satellites phones, etc.). The method and apparatus of the present invention also functions equally well in network-based applications.

Referring to the drawing, a block diagram of an apparatus 10 for returning a false signal substantially similar to at least a first portion of a SIT after a device receiving the call puts the telephone line 11 in an off-hook condition. The apparatus 10 includes a controller 12, an off-hook detector 14, a programmable oscillator 18, an amplifier 22, a buffer/interface 24, a SIT/mode selection 28, and a power distribution 30. Additionally, the apparatus 10 may be adapted to receive a battery 32.

The power distribution 30 distributes power to the constituent components of the apparatus 10 (i.e., controller 12, programmable oscillator 18, amplifier 22, buffer/interface 24). In the embodiment being described, the power distribution 30 is adapted to receive power from a battery 32. In an alternate embodiment, as shown in the drawing, the power distribution 30 is adapted to additionally receive power from the incoming telephone line 11 to supplement the power received from the battery 32. In still another alternate embodiment, the power distribution 30 is adapted to receive power from the incoming telephone line 11 without relying on power from a battery 32. Preferably, the battery 32 used in conjunction with the power distribution 30 is a single button cell battery. However, multiple button cell batteries and other types of batteries capable of providing the required power are also contemplated.

The controller 12 receives and processes information from the SIT/mode selection 28 according to programmed instructions. The SIT/mode selection 28 enables a user of the apparatus to select one of multiple SITs and one of multiple modes of operation for generation of the false signal. For example, in the embodiment being described seven SITs are identified as SIT1, SIT2, SIT3, SIT4, SIT5, SIT6, and SIT7 and three modes of operation are identified based on the generation of one-part, two-part, and three-part tone sequences with respect to the selected SIT. Preferably, the SIT/mode selection 28 is comprised of DIP switches. For example, a combination of 10 DIP switches could be adapted to permit user selection of SIT and mode of operation in the example described above. Alternatively, less DIP switches could accomplish the same SIT/mode selection function as the 10 DIP switches if a decoding scheme is implemented. Those skilled in the art will recognize that numerous alternate types and quantities of switches that accomplish the desired function are also possible and are contemplated herein.

The controller 12 is also in communication with an off-hook detector 14 that is in communication with the incoming and outgoing telephone line 11 of the telephone system. The programmable oscillator 18 is capable of creating false signals that successfully imitate SITs under control of the controller 12. The controller 12 programs the programmable oscillator 18 based on the condition of the SIT/mode selection 28 determines which SIT will be imitated and the number of tones (i.e., portions or parts) of the SIT that will be generated by the programmable oscillator 18. When the off-hook detector 14 detects that a user device has responded to an incoming telephone call by placing the telephone line 11 in an off-hook condition, the controller 12 causes the programmable oscillator 18 to generate the false signal. For example, if the user selects SIT2 and one-part tone operation, the programmable oscillator 18 generates a 913.8 Hz sine wave for 274 ms. This signal is substantially the first portion of an intercept SIT (SIT2) which is used by the telephone network to indicate a nonworking number. Alternatively, if the user selects SIT2 and three-part tone operation, the programmable oscillator 18 generates a 913.8 Hz sine wave for 274 ms, followed by a 1370.6 Hz sine wave for 274 ms, followed by a 1776.7 Hz sine wave for 380 ms.

In general, the apparatus 10 functions by sending an imitation SIT into the telephone line 11 whenever a telephone, answering machine, or other type of user device capable of answering the incoming call places the telephone line to an off-hook condition. This is accomplished when the off-hook detector 14 detects, for example, that a telephone has been taken off-hook. The controller 12 receives the signal from the off-hook detector 14 and takes the steps or performs the functions necessary to send the signal produced by the programmable oscillator 18 into the telephone line 11. By doing so, most predictive dialing telemarketing systems calling the number will received the SIT and disconnect or terminate the call, and thus be defeated.

In the embodiment of the invention depicted in the drawing, the controller 12 sends the false signal imitating a SIT or a portion thereof into the telephone line 11 by activating a buffer/interface 24 that connects the signal directly into the telephone line 11. The programmable controller 18 is connected to an amplifier 22 such that the false signal produced by the programmable controller 18 may be amplified to a level that imitates the SITs used by the telephone network. The amplified false signal then is buffered and conditioned by the buffer/interface 24 before it is sent into the telephone line 11 so that the apparatus 10 conforms with all FCC and telephone system regulations. As described, the controller 12 controls both the programmable controller 18 and the buffer/interface 24 based on the condition of the SIT/mode selection 28 and the off-hook detector 14 and only connects the false signal to the telephone line 11 in response to an incoming call after a user device places the telephone line 11 in an off-hook condition. In another embodiment of the present invention, the controller 12 may accomplish the desired function by controlling the programmable oscillator 18 without directly controlling the buffer/interface 24. In a further embodiment, the controller 12 may be adapted to recognize that an incoming call has caused the phone to ring. The controller 12 then may transmit the imitation SIT signal to the incoming call. However, the apparatus 10 does not send the false signal when a user telephone employing the apparatus 10 is used to place a call.

Thus it should be evident that the device and methods of the present invention are highly effective for defeating a predictive dialing telemarketing system. Based upon the foregoing disclosure, it should now be apparent that the use of the apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, signal generators according to the present invention are not necessarily limited to those having an oscillator and an amplifier. Moreover, as noted hereinabove, other means for selectively sending the imitation signal can be substituted for the controller. Thus, the scope of the invention shall include all modifications and variations that may fall within the scope of the attached claims.

What is claimed is:

1. An apparatus in communication with a telephone line, comprising:
   a power distribution member;
   a programmable oscillator for selectably generating a one-part false signal substantially similar to a first part of a special information tone (SIT) from a group of multiple SITs;
   an off-hook detector operationally coupled to the telephone line;
   a controller in communication with said power distribution member, said programmable oscillator, and said off-hook detector, wherein the controller controls said programmable oscillator and determines when the false signal is operationally coupled to the telephone line in response to an incoming call; and,
   a mode selection member for selecting the special information tone (SIT) to be generated by said programmable oscillator from the group of multiple SITs.

2. An apparatus according to claim 1, wherein:
   the programmable oscillator selectably generates a two-part false signal substantially similar to a first part and a second part of a special information tone (SIT) from a group of multiple SITs; and,
   the mode selection member selects whether the programmable oscillator generates a one-part false signal or a two-part false signal.

3. An apparatus according to claim 2, wherein:
   the programmable oscillator selectably generates a three-part false signal substantially similar to a first part, a second part, and a third part of a special information tone (SIT) from a group of multiple SITs; and,
   the mode selection member selects whether the programmable oscillator generates a one-part false signal, a two-part false signal, or a three-part false signal.

4. An apparatus according to claim 3, wherein the programmable oscillator selectably generates a false signal substantially similar to a special information tone (SIT) from a group of SITs consisting of SIT1, SIT2, SIT3, SIT4, SIT5, SIT6, and SIT7.

5. An apparatus according to claim 3, wherein the programmable oscillator selectably generates a false signal substantially similar to a special information tone 2 (SIT2) and the first part of the false signal is a 913.8 Hz sine wave for 274 milliseconds, the second part of the false signal is a 1370.6 Hz sine wave for 274 milliseconds, and the third part of the false signal is a 1776.7 Hz sine wave for 380 milliseconds.

6. An apparatus in communication with a telephone line, comprising:
   a programmable oscillator that selectably generates a one-part false signal substantially similar to a first part of a special information tone (SIT) from a group of multiple SITs;
   a mode selection member for selecting the SIT to be generated by said programmable oscillator;
   an off-hook detector operationally coupled to the telephone line;
   a controller in communication with said programmable oscillator, said mode selection member, and said off-hook detector, wherein the controller determines the condition of the mode selection member, controls said programmable oscillator in response to the condition of the mode selection member, and operationally couples the false signal to the telephone line in response to incoming calls; and, a power distribution member adapted for receiving power from a battery and distributing power to constituent components of the apparatus.

7. An apparatus according to claim 6, wherein the power distribution member is adapted to receive power from the telephone line for supplementing the power received from the battery.

8. A method for sending a false signal on a telephone line substantially similar to at least a first part of a special information tone (SIT) in response to an answered incoming telephone call, comprising the steps of;

a) selecting a mode of operation from a group of multiple operating modes;

b) selecting a SIT from a group of multiple SITs;

c) detecting an off-hook condition in the telephone line;

d) generating a false signal according to the selected SIT and the selected mode of operation; and, e) sending the false signal over the telephone line in response to the incoming telephone call once the off-hook condition is detected.

9. The method according to claim 8, step b) further including:

f) selecting a special information tone (SIT) from a group of SITs consisting of SIT1, SIT2, SIT3, SIT4, SIT5, SIT6, and SIT7.

10. An apparatus in communication with a telephone line, comprising:

a power distribution member receiving electrical power from a source other than standard a.c. utility electrical power;

a programmable oscillator for selectably generating a false signal substantially similar to at least a first part of a special information tone (SIT);

a controller operationally coupled to the telephone line and in communication with the power distribution member and the programmable oscillator, wherein the controller controls the programmable oscillator and determines when the false signal is operationally coupled to the telephone line in response to an incoming call; and, a mode selection member for selecting a mode of operation for the apparatus from a group of modes consisting of a one-part false signal generation mode, a two-part false signal generation mode, and a three-part false signal generation mode.

11. The apparatus according to claim 10, wherein:

the mode selection member selects the one-part false signal generation mode; and, the programmable oscillator selectably generates a false signal substantially similar to a first part of a special information tone (SIT).

12. The apparatus according to claim 10, wherein:

the mode selection member selects the two-part false signal generation mode; and, the programmable oscillator selectably generates a false signal substantially similar to a first part and a second part of a special information tone (SIT).

13. The apparatus according to claim 10, wherein:

the mode selection member selects the three-part false signal generation mode; and, the programmable oscillator selectably generates a false signal substantially similar to a first part, a second part, and a third part of a special information tone (SIT).

14. An apparatus in communication with a telephone line, comprising:

a power distribution member receiving electrical power from a source other than standard a.c. utility electrical power;

a programmable oscillator for selectably generating a false signal substantially similar to at least a first part of a special information tone (SIT), wherein the programmable oscillator selectably generates a false signal selected from a group of multiple false signals, each false signal associated with a special information tone (SIT) selected from a group of multiple SITs;

a controller operationally coupled to the telephone line and in communication with the power distribution member and the programmable oscillator, wherein the controller controls the programmable oscillator and determines when the false signal is operationally coupled to the telephone line in response to an incoming call; and, a special information tone (SIT) selection member for selecting the SIT from the group of multiple SITs and the associated false signal from the group of multiple false signals to be generated by the programmable oscillator.

15. The apparatus according to claim 14, wherein the group of multiple special information tones (SITs) includes at least two SITs selected from a group of SITs consisting of SIT1, SIT2, SIT3, SIT4, SIT5, SIT6, and SIT7.

16. A method for sending a false signal on a telephone line substantially similar to a special information tone (SIT) in response to an incoming telephone call, comprising the following steps:

a) receiving electrical power from a source other than standard a.c. utility power;

b) receiving the incoming telephone call;

c) selecting a mode of operation from a group of modes comprising a one-part false signal generation mode, a two-part false signal generation mode, and a three-part false signal generation mode;

d) selectably generating a false signal that is substantially similar to at least a first part of a special information tone (SIT);

e) determining a time when the false signal is operationally coupled to the telephone line; and, f) sending the false signal over the telephone line in response to the incoming telephone call once the off-hook condition is detected.

17. The method according to claim 16, wherein the mode selected in step c) is the one-part false signal generation mode, wherein the false signal generated in step d) is substantially similar to a first part of the special information tone (SIT).

18. The method according to claim 16, wherein the mode selected in step c) is the two-part false signal generation mode, wherein the false signal generated in step d) is substantially similar to a first part and a second part of the special information tone (SIT).

19. The method according to claim 16, wherein the mode selected in step c) is the three-part false signal generation mode, wherein the false signal generated in step d) is substantially similar to a first part, a second part, and a third part of the special information tone (SIT).

20. A method for sending a false signal on a telephone line substantially similar to a special information tone (SIT) in response to an incoming telephone call, comprising the following steps:

a) receiving electrical power from a source other than standard a.c. utility power;

b) receiving the incoming telephone call;

c) selectably generating a false signal that is substantially similar to at least a first part of a special information tone (SIT);
d) selecting a false signal from a group of multiple false signals, each false signal associated with a special information tone (SIT) selected from a group of multiple SITs;
e) determining a time when the false signal is operationally coupled to the telephone line; and,
f) sending the false signal over the telephone line in response to the incoming telephone call once the off-hook condition is detected.

21. The method according to claim 20, wherein the group of multiple special information tones (SITs) in step d) includes at least two SITs selected from a group of SITs consisting of SIT1, SIT2, SIT3, SIT4, SIT5, SIT6, and SIT7.

* * * * *